Dec. 21, 1965    J. L. OSTBORG    3,224,423
VALVE TIMING CONTROL SYSTEM FOR SUPERCHARGED AUTOMOTIVE ENGINE
Filed June 3, 1965    5 Sheets-Sheet 1

INVENTOR.
JOHN L. OSTBORG
BY Tom Walker
ATTORNEY

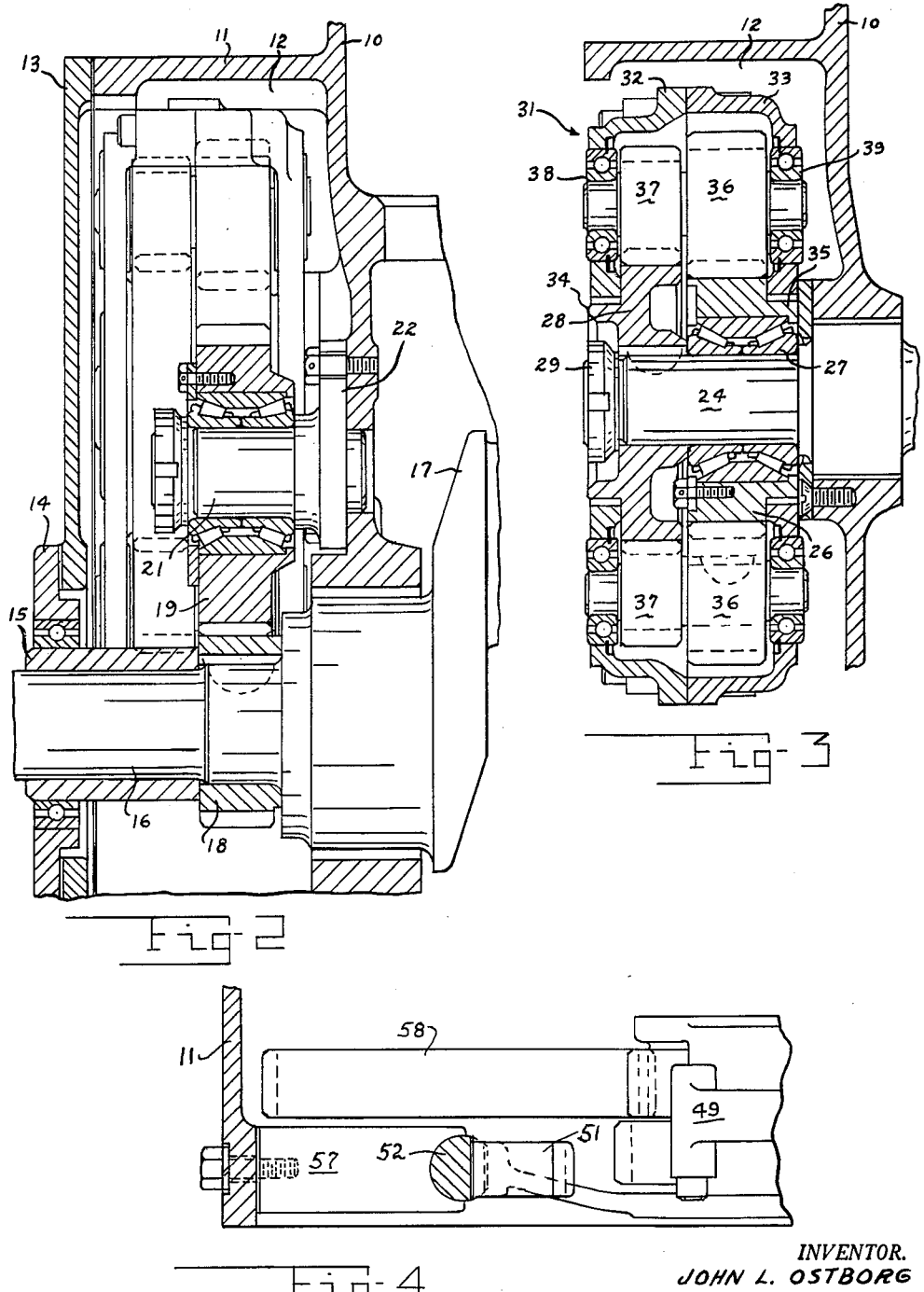

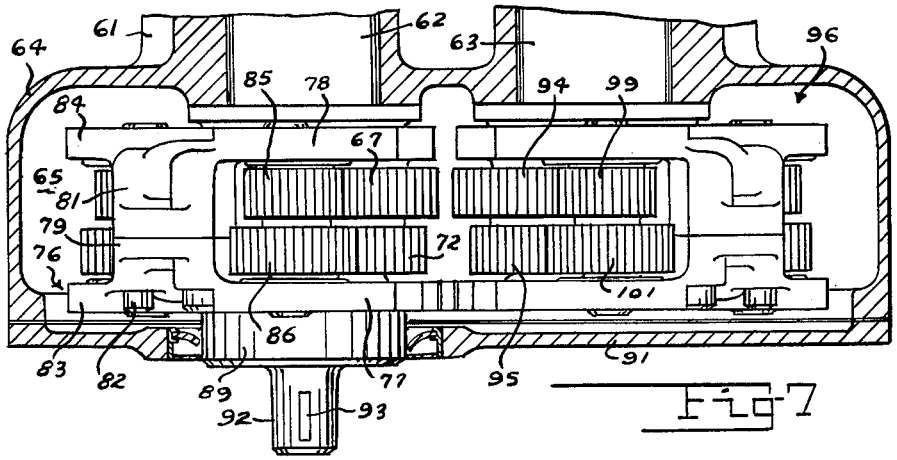
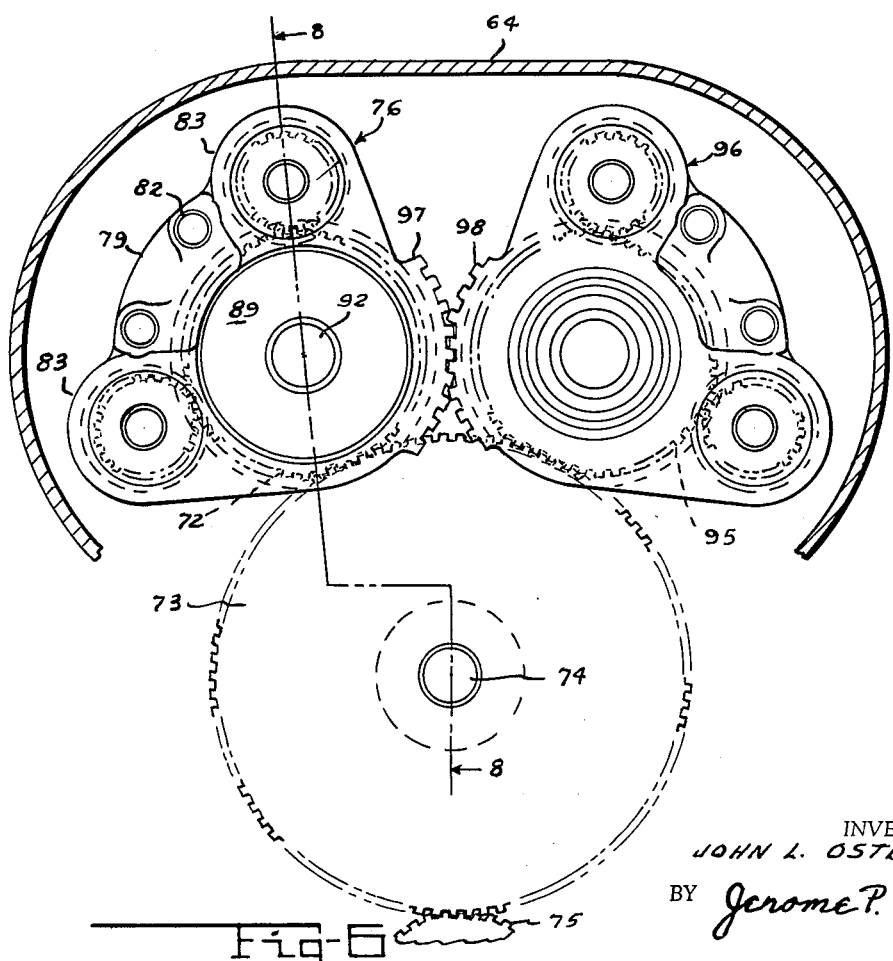

Dec. 21, 1965  J. L. OSTBORG  3,224,423
VALVE TIMING CONTROL SYSTEM FOR SUPERCHARGED AUTOMOTIVE ENGINE
Filed June 3, 1965  5 Sheets-Sheet 5

INVENTOR.
JOHN L. OSTBORG
BY Jerome P. Bloom
ATTORNEY

United States Patent Office 3,224,423
Patented Dec. 21, 1965

3,224,423
VALVE TIMING CONTROL SYSTEM FOR SUPER-
CHARGED AUTOMOTIVE ENGINE
John L. Ostborg, 4350 Redmond Road, Springfield, Ohio
Filed June 3, 1965, Ser. No. 467,169
17 Claims. (Cl. 123—90)

This application is a continuation in part of my pending application Serial No. 137,901, filed September 13, 1961, for Supercharged Diesel Truck Engine.

This invention relates to valve timing controls in supercharged internal combustion engines and has particular reference to automotive engines of the diesel type.

The supercharging of an engine tends to increase its efficiency and power output. While enjoying reasonably successful use in stationary engines, the supercharging principle has had more limited application to automotive engines. The comparatively high heat level, the wide variation in engine load and other factors has required a compromise adjustment in the valve timing (in the case of a fixed timing installation) which is satisfactory neither for a no-load, naturally aspirated, condition nor for a full-load, supercharged, condition. Moreover, control systems using changing intake manifold pressure as a means to effect automatic changes or corrections in the timing of valve actuation have not heretofore had utility in automotive engines. The mechanisms proposed, involving the use of eccentric shafts and special cam followers and rods, tend to perform inconsistently in automotive engines and materially complicate design problems.

The object of the invention is to simplify the construction as well as the means and mode of operation of supercharged diesel truck engines, whereby such engines may not only be economically manufactured, but will be more efficient and satisfactory in use, greatly increased in power output, adaptable to a wide variety of applications, and be unlikely to get out of order.

A further object of the invention is to provide a generally new crank shaft-cam shaft assembly for use in an automotive or like engine in which a timing control system may operate in a substantially more facile and effective manner than heretofore.

Another object of the invention is to utilize a valve timing control system not requiring the use of special cam followers and rods.

A further object of the invention is to introduce a new concept of valve timing in which the phase relationship of actuation of both the exhaust valve and the intake valve is changed relative to the crank shaft rotation.

A still further object of the invention is to utilize a principle of planetary gearing in a compact assembly in which all of the principal elements of the control system and of the drive mechanism are contained in the engine crank case.

A still further object of the invention is to operate the exhaust and intake valves from separate cam shafts driven by the crank shaft through gear means including orbitally adjustable planetary gear means, each making, according to one embodiment of the invention an independent respose to variations in manifold air pressure.

Still another object of the invention, according to another embodiment thereof, is to adapt the timing controls for use in an engine featuring overhead valve actuation.

A still further object of the invention is to provide for a mode of operation in the control system whereby the phase relationship of exhaust and intake valve actuation, relative to crankshaft operation, is adjusted simultaneously but in inverse relation to one another.

A further object of the invention is to provide a supercharged automotive engine possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention;

FIG. 2 is a view in cross-section, taken substantially along the line 2—2 of FIG. 1;

FIG. 3 is a fragmentary view in cross-section taken substantially along the line 3—3 of FIG. 1;

FIG. 4 is a fragmentary view in longitudinal section taken substantially along the line 4—4 of FIG. 1;

FIG. 6 is a view similar to FIG. 1, showing a second illustrated embodiment of the invention;

FIG. 7 is a top plan view of the compartment of FIG. 6, a part of the compartment wall being broken away and a front closure plate being shown.

Like parts are indicated by similar characters of reference throughout the several views.

Figure 1:
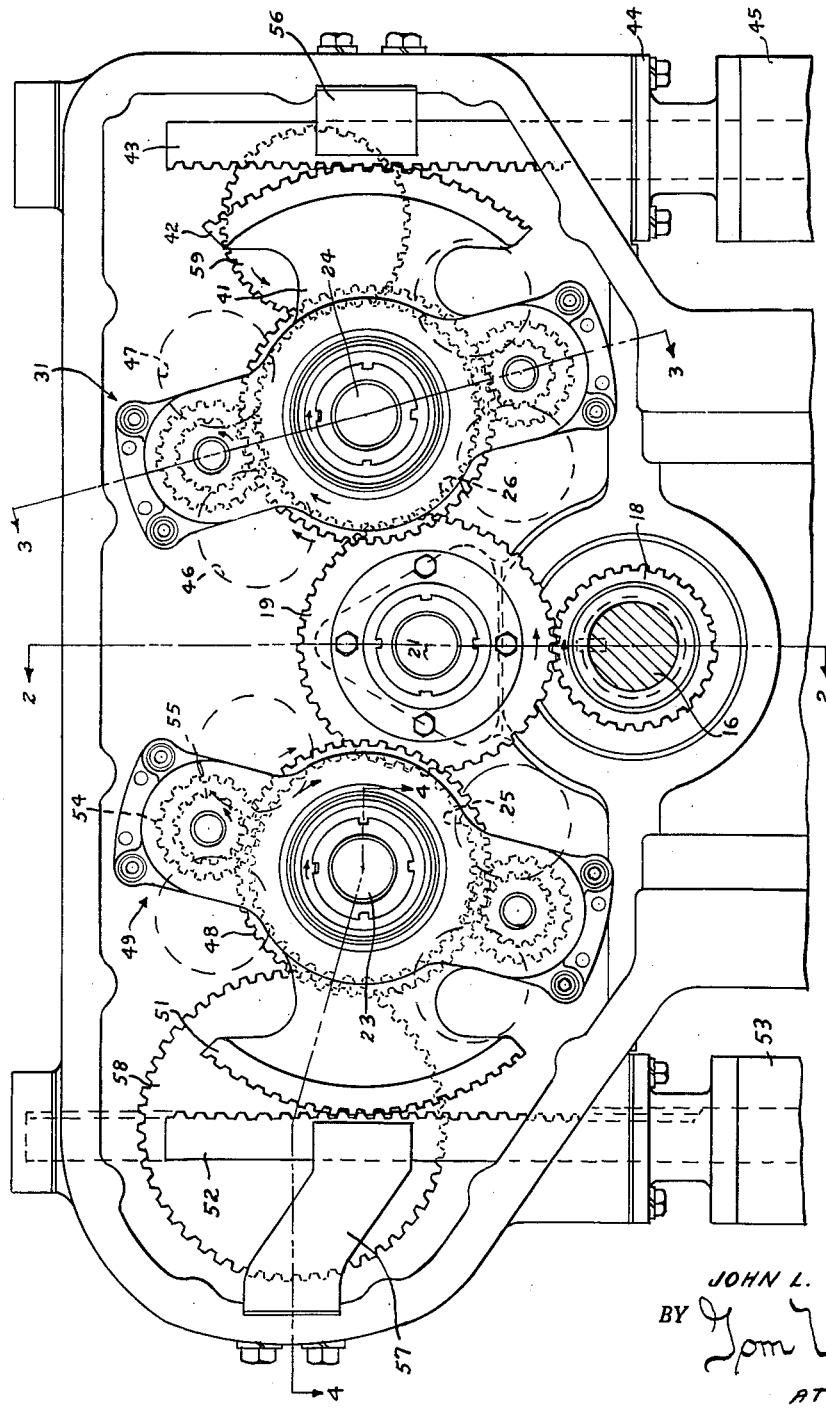
FIG. 1 is a partly diagrammatic view of an engine drive and control system in accordance with a first illustrated embodiment of the invention, the view being taken at one end of the crank case, looking into a gear compartment.
Figure 5:
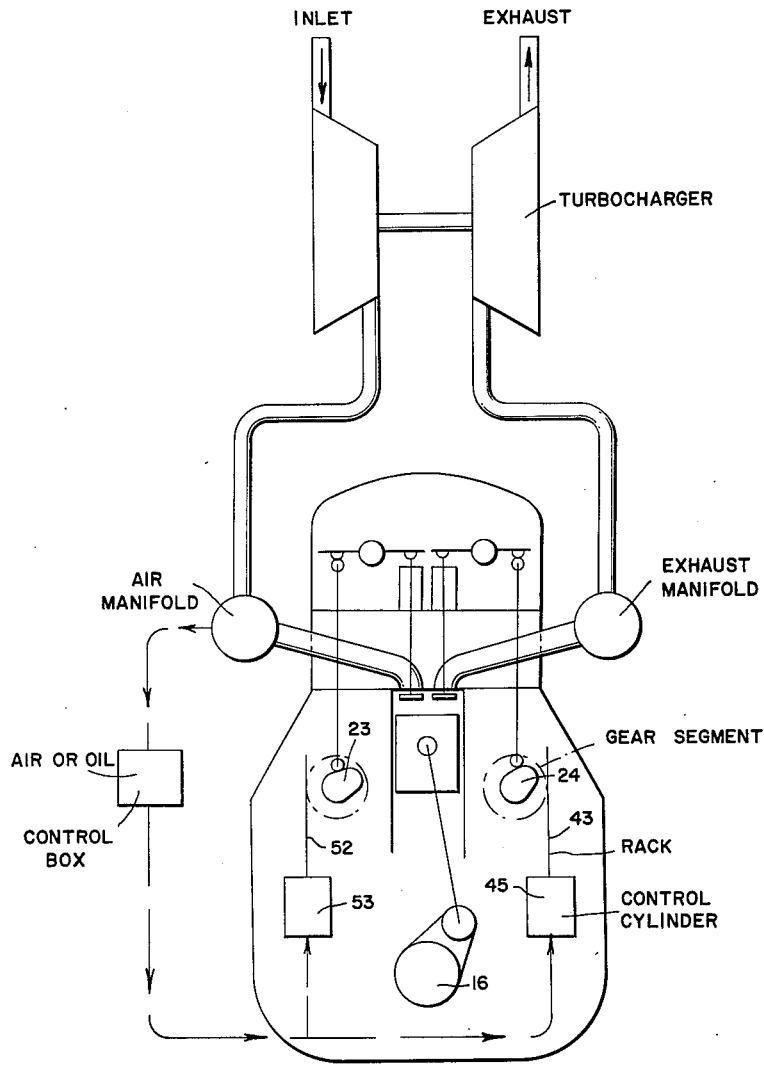
FIG. 5 is a schematic showing of the invention in an environment of its use.

Referring to the drawings, and first to the embodiment of FIGS. 1-5 as shown in FIG. 2 the engine in which the invention is illustratively embodied comprises a body 10 from which projects a unitary flange 11 defining a gear compartment 12 in line with and in effect forming a part of the crank case. The compartment 12 is closed normally by a detachable plate 13, at the center of which is a supplemental seal plate 14. The latter receives a bushing 15 on shaft 16, such shaft being the crank shaft of the engine. In addition, the shaft 16 is rotatably mounted in the back wall of compartment 12, and, beyond such wall as indicated is formed with crank means 17.

Within compartment 12 the crank shaft 16 has keyed thereto a gear 18 which is in continuous meshing engagement with an idler gear 19 rotatably mounted on a stud 21 which through an integral flange 22 is secured to the body 10 or the back wall of compartment 12, so defined thereby.

Now referring also to FIG. 1, which is a front elevational view of the gear compartment 12 with the plates 13 and 14 removed, stud 21 is seen to overlie the crank shaft 16 and the two to be disposed in an intermediate position relative to the ends of a pair of cam shafts 23 and 24 which extend in parallel relation to the crank shaft 16 through and beyond the inner wall of compartment 12 and carry cams for actuating the cylinder valves. According to a feature of the invention the cam shafts 23 and 24 are adapted separately to actuate the valves, one thereof being constructed and arranged to effect opening and closing of the exhaust valves and the other thereof being adapted to effect opening and closing of the intake valves. Rotary motion of the cam shafts effects successive opening and closing motions of the valves, the operation being carried out in a timed relation to one another to enable pressurizing and scavenging of the engine cylinders, all further in a timed relation to the rotation of the crank shaft 16 as will hereinafter more clearly appear.

Idler gear 19 has a common meshing engagement with a gear 25 on the shaft 23 and with a like gear 26 on the shaft 24. The gears 25 and 26 are a part of separate, adjustable gear drives extending from the crank shaft 16 to the respective cam shafts and which are effective to rotate the cam shafts in company with the crank shaft. Considering such gear drive as it extends to shaft 24, and referring also to FIG. 3, the shaft 24 has, as indicated, a rotatable bearing in the stationary inner wall of compartment 12. The gear 26 is mounted thereon, adjacent to such inner wall, through a bearing means 27 in such manner as to be freely rotatable on the shaft. In adjacent, axially aligned relation to the gear 26 is another gear 28, this one, however, being keyed to the shaft 24 for unison rotation. A lock nut 29 holds the described parts in position on the projecting end of the shaft 24.

In transversely disposed, partly surrounding, relation to such projecting end of the shaft 24 is a planetary gear case 31 comprised of mating case elements 32 and 33 suitably held together and rotatable on flanges 34 and 35 on respective gears 28 and 26 in such manner as to mount the planetary case for rocking motion about shaft 24 as an axis. Radially projecting portions of the planetary gear case 31, on opposite sides of the shaft 24, each carry an identical unitary gear assembly comprising a gear 36 and a gear 37, the former meshing with gear 26 and the latter meshing with gear 28. Each such gear assembly is rotatably mounted in bearings 38 and 39 in respective parts 32 and 33 of the gear case 31.

Further, part 32 of the case 31 has a laterally projecting integral portion 41 (FIG. 1) terminating in an arcuate toothed segment 42. The latter is in continuous meshing engagement with a toothed rack 43 which projects upwardly into the compartment 12 from the underside thereof and transversely of the shafts 16, 23 and 24. Downwardly of compartment 12, the rack 43 extends through a fitting 44 into a cylinder 45 in which is piston means (not shown) adapted to effect extending and retracting movements thereof under applied air or liquid pressure. The cylinder 45 is suitably connected in a control system, for example as disclosed in Miller, Patent Number 2,670,595, to be pressurized in correspondence with the manifold air pressure whereby the rack 43 may assume an extreme position under minimum engine load conditions and may move to and assume an opposite extreme position under full operating load conditions. Longitudinal shifting motion of the rack 43 as described effects an oscillatory or rocking movement of the segment 42 which in turn effects a corresponding rocking motion of the planetary gear case 31 and the parts carried thereby. The construction and arrangement of parts is such as to move the gear assemblies 36–37 in an orbital path relative to the shaft 24 between opposite extremes of movement as defined by the broken line circles 46 and 47.

The gears of each pair 36–37 are differentially constructed as to number of teeth, and, as heretofore noted, the gear 26 is stationary in respect to the rocking motion of the planetary gear case since it is positively connected to the crank shaft through idler gear 19 and crank shaft drive gear 18. Hence as the planetary gear case moves in a rocking motion about the shaft 24, relatively large gear 36 tracks in gear 26. Rotating with the gear 36, smaller gear 37 is unable on account of its differential tooth construction to rotate in synchronism with the larger gear and accordingly enforces a relative turning motion of the gear 28 with which it meshes and of shaft 24 with which gear 28 has a driving connection. The result of rocking adjustment of the planetary gear case 31 is thus to effect a greater or lesser increment of rotary motion of the cam shaft 24. This achieves, as will be understood, a change in the phase relationship as between the crank shaft 16 and the affected cam shaft to bring about a change in timing of the valves actuated from the cam shaft.

The differential characteristics of the gears 36–37 is compensated for in an inverse relationship of the gears 26 and 28 in such manner that the normal drive through the planetary gear mechanism is at no change in rotation. The gear assemblies 36–37 it will be further understood constitute not only timing adjustment means but form a part of the direct drive connection from the crank shaft 16 to the cam shaft 24 whereby the cam shaft rotates in company with the crank shaft.

The drive from crank shaft 16 at the other cam shaft 23 and the means for effecting angular adjustment of shaft 23 relative to the crank shaft are identical to those described in connection with shaft 24. Briefly then they comprise, in addition to the gear 25 meshing with idler gear 19, another gear 48 connected to shaft 23 for unison rotation, planetary gear case 49 having arcuate gear segment 51, meshing rack 52 and an air or oil actuated cylinder 53 utilizing variations in manifold air pressure to effect extending and retracting movement of the rack 52. The gear case 49 includes two sets of gears 54 and 55 meshing respectively with the gears 25 and 48, these sets of gears transmitting the rotary motion of the crank shaft to the cam shaft 23 and also having motion in an orbital sense in response to the stroke of the rack 52 to effect relative angular adjustment of the shaft 23 for varying the time of actuation of the valve controlled thereby.

The rack 43 is guided in its motion by a channel member 56 secured to the inner wall of compartment 12. A similar guide member 57 extends from the opposite wall of the compartment 12 and engages rack 52. The gears 25 and 26 on the respective cam shafts 23 and 24 are utilized also to transmit the rotary drive of the crank shaft to respective gears 58 and 59 suitably connected in a driving relation to the fuel and oil pumps. The arrangement places the gears 58 and 59 in flanking relation to the crank shaft and cam shafts, the entire assembly being compactly contained in the compartment 12.

The cylinders 45 and 53 are connected to a common pressure source and are actuated in response thereto, carrying out a corresponding positioning of the racks 43 and 52. Accordingly, the change in timing as between the actuation of the exhaust valves and the actuation of the intake valves is of corresponding, complementary extent. The arrangement, however, enables any desired initial or normal pattern to be established providing greater or lesser amounts of overlapping in valve actuation under what may be considered normal conditions.

While a planetary gear train form of adjustment has been shown in the drive to both cam shafts, modifications in this concept are, of course, possible, for example using a planetary gear train in connection with only one of the cam shafts and effecting a timing change through the other shaft by other means. Thus one of the cam shafts might be made with two sets of cams per cylinder, one for the naturally aspirated conditions and the other for the supercharged condition. By shifting the cam shaft axially by an air or oil cylinder such as the cylinders 45 and 53 the two sets of cams may be made alternatively effective upon the cam followers.

Figure 8:
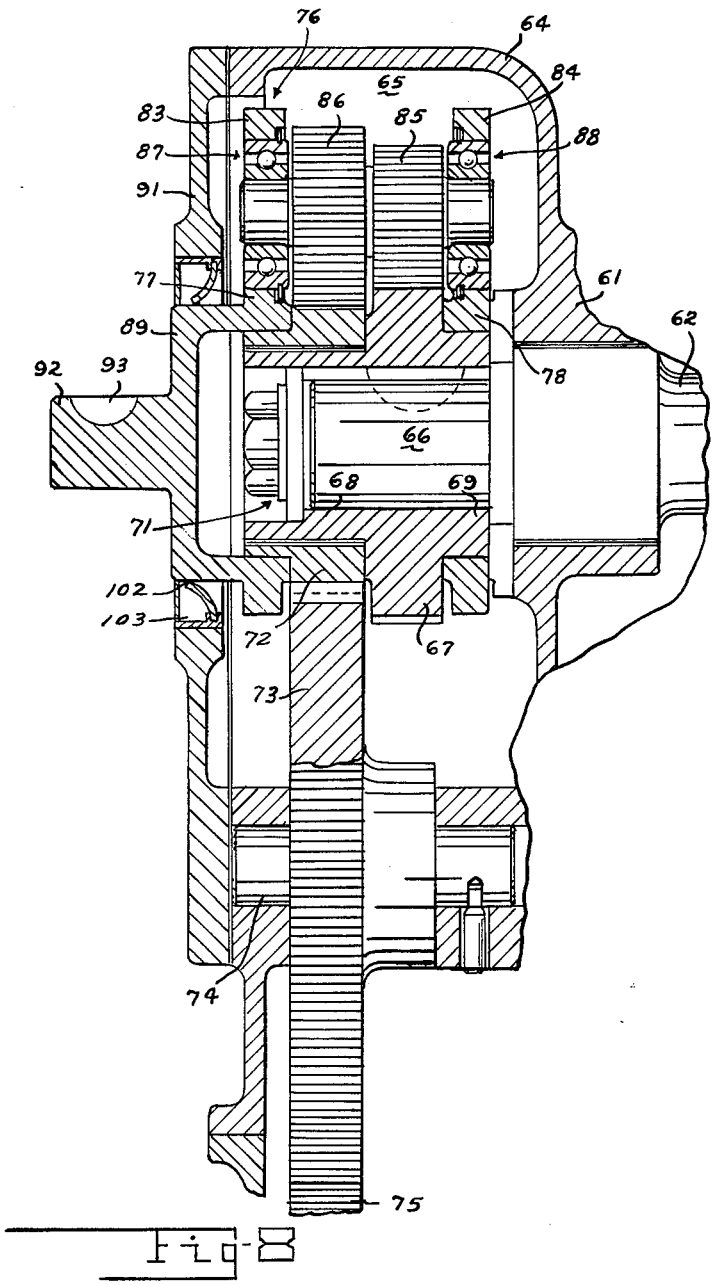
FIG. 8 is a view in cross-section taken substantially along the irregular line 8—8 of FIG. 6, a front closure plate being added.

Although not so limited, the variable cam shaft timing device of the second illustrated embodiment of the invention (FIGS. 6, 7 and 8) is particularly applicable to engines having two, three or four valves per head, using two overhead cam shafts per cylinder bank. The timing mechanism can be applied to either an in-line engine or a V engine. Considering the second illustrated embodiment, a body 61 mounts cam shafts 62 and 63 in a parallel nearby relation to one another. At their one ends the shafts 62 and 63 extends into a common case 64 defining a gear compartment 65 at one end of the body 61. The described projecting ends of the shafts are reduced in diameter, as shown in connection with shaft 62 in FIG. 8, and define stepped down extensions 66 thereon. On the extension 66 is a gear 67 having laterally projecting flange portions 68 and 69. A retainer means 71 is installed in the end of the shaft extension 66 and holds the gear 67 to a seat at the base of such extension.

The gear 67 is keyed to the shaft extension 66 for unison rotation therewith. Relatively rotatably mounted on flange portion 68 of gear 67 is another gear 72. This gear is in meshing engagement with a gear 73 rotatably mounted on a stud shaft 74 installed in the body 61 in an underlying relation to the shafts 62 and 63 and intermediate the vertical planes in which these shafts lie. The gear 73 further is in mesh by way of idlers with a gear 75 mounted on the crank shaft (not shown), the gears 73 and 75 corresponding in position and function to the gears 19 and 18 of the first considered embodiment. Although not shown herein, the crank shaft may be considered as projecting into the gear compartment in generaly cooperative relation to the cam shafts and their timing controls.

Continuing to consider the cam shaft 62, there is associated therewith a gear case 76 comprised of mating case elements 77 and 78 respectively rotatable upon a flange on the gear 72 and on the flange portion 69 of the gear 67. The elements 77 and 78 are bridged by abutting formations 79 and 81 (FIG. 7) through which bolts 82 extend. The elements 77 and 78 accordingly are interconnected for unison rotary adjustment about the shaft 62 as an axis. At circumferentially spaced points the case 76 is formed, on each element 77 and 78, with projecting ears 83 and 84, each opposing pair of such ears mounting between them a unitary gear assembly comprising a gear 85 and a gear 86. Carried thus in radially offset relation to the axis of shaft 62, and in overlying relation to the gears 67 and 72, the gear 85 of each unitary gear assembly meshes with the gear 67 and the gear 86 theerof meshes with the gear 72. Each described gear assembly is rotatable in bearings 87 and 88 in the respective ears 83 and 84.

Element 77 of the gear case 76 further is formed, coaxially of the shaft 62, wth a hub 89 projecting outside the compartment 65 through and beyond a plate 91 mounted in closing relation to such compartment. The hub 89 terminates in a reduced diameter stub shaft 92 containing a keyway 93 or otherwise formed to facilitate its engagement by turning means. Accordingly, through engagement of the projecting stub shaft 92 with external operating means, the gear case 76 is subject to oscillatory motion. According to the construction and arrangement of parts, and in accordance with the mode of operation described in connection with the first considered embodiment, such oscillatory motion of the gear case 76 effects an orbital travel of the connected gear assemblies comprising gears 85 and 86.

The gears of each pair 85-86 are differentially constructed as to number of teeth. The gear 72 is stationary in respect to the rocking motion of the gear case since it is positively connected to the crank shaft through idler gear 73 and crank shaft drive gear 75. Hence, as discussed in connection with the first considered embodiment, the result of rocking adjustment of the gear case 76 is to effect a greater or lesser increment of rotary motion of the cam shaft 62 through a connection afforded by gears 85 and 67 reacting on gear 72. This achieves a change in the phase relationship as between the crank shaft and the affected cam shaft to bring about a change in timing of the valves actuated from the cam shaft, and this will be an advance in or a retarding of such timing depending upon the direction of motion in which the cam shaft is adjusted.

The gears 85-86 thus form a part of the direct drive connection from the crank shaft to the cam shaft 62 and are, in addition, adjustable to effect an independent rotation of the cam shaft for timing variation purposes.

Associated with the cam shaft 63 is mechanism like that described and shown in connection with cam shaft 62. Thus, the projecting outer end of cam shaft 63 mounts a gear 94 for unison motion and a gear 95 for relative motion, the latter having a meshing engagement with idler gear 73 which gear is thus common to the parts associated with each cam shaft. A gear case 96 is rotatably mounted on flanges on the gears 94 and 95 and is constructed to be identical to the gear case 76 except for the omission of a hub 89 and projected stub shaft 92. Thus while the gear case 96 could be formed with such a hub and such a projecting stub shaft, and operated in the separate and independent manner of the two cam shafts of the first considered embodiment, in the present instance the operation of the case 96 is made dependent upon and subject to operation of the gear case 76.

To accomplish this the gear cases 76 and 96 are formed with mating gear segments 97 and 98. Further, by virtue of their manner of interconnection, the gear cases are constrained to move in respectively opposite directions. Thus, a rotary impulse delivered to the stub shaft 92 in a clockwise direction, as viewed in FIG. 6 achieves a corresponding motion in the same direction of the gear case 76 and of the sets of connected gears 85 and 86 carried thereby. At the same time, however, through the connection afforded by the meshing segments 97 and 98 the gear case 96 is given a corresponding but opposite direction of motion, carrying sets of connected gears 99 and 101 in a counterclockwise direction over the respective gears 94 and 95. As a result an increment of rotary adjustment given the cam shaft 62 is matched by a corresponding increment of rotary adjustment given the shaft 63 but in a contrary direction. Rotary adjustment of the stub shaft 92 accordingly produces equal and opposite adjustment of the shafts 62 and 63. This mode of operation may have particular value in changing from timing suitable for naturally aspirated engines to supercharged engines in that one set of cams should be advanced and the other retarded. Further, while the timing adjustment is here disclosed as occurring in equal amounts it will be understood that differential adjustment is possible, as by substituting other suitable gearing for the meshing, mating segments 97 and 98.

Regarding the means for effecting the timing adjustment, the change may be made manually through a lever mechanism terminating at the stub shaft 92 and operable at the discretion of the vehicle operator. Also it may be done automatically by a mechanism responsive to the intake air manifold pressure as in the first considered embodiment. In the latter instance the parts would be constructed to change from a naturally aspirated timing to supercharged timing under selected conditions, as when the engine approaches its optimum performance as a naturally aspirated engine.

The hub 89 projects through an opening 102 in closure plate 91. There may be positioned in the opening 102, to surround hub 89, a sealing means 103.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but selected ones of several modes of putting the invention into effect, and the invention is therefore claimed in any of its forms or modifications within the legitimate and valid scope of the appended claims.

Having thus described my invention, I claim:

1. A supercharged engine having intake and exhaust valves, including a crankshaft, an exhaust valve actuating cam shaft, an intake valve actuating cam shaft, a crank case having a gear compartment at one end, said crankshaft being longitudinally disposed in said case and extending through said compartment, said cam shafts being on respectively opposite sides of said crankshaft, in parallel nearby relation thereto, a pair of gears positioned on each of said cam shafts within said compartment, one gear rotatable thereon and the other connected to the cam shaft for unison rotation, a positive gear drive extending from said crankshaft to the said one gear on each of said cam shafts, a planetary gear case about each of said cam shafts rotatable about its respective shaft as an axis, orbital gear means carried by said gear case including two connected gears of differential tooth number meshing respectively with the gears on the associated cam shaft on respectively opposite sides thereof, a plurality of rack means, one for each of said cam shafts extending into said compartment in generally transverse relation to said shafts therein, a positive connection between each of said rack means and a respective planetary gear case producing a rocking motion of the connected planetary gear case about its respective cam shaft in response to longitudinal shifting motion of a respective rack means, and manifold air pressure responsive means effecting longitudinal shifting motion of said rack means.

2. A supercharged truck engine having exhaust and intake valves including a crankshaft, an exhaust valve actuating cam shaft, an intake valve actuating cam shaft, a crank case providing a gear compartment at one end thereof, said crankshaft being longitudinally disposed in said case and extending through said compartment, said cam shafts being respectively on opposite sides of said crankshaft in parallel adjacent relation thereto, a pair of flanged gears on each of said cam shafts in said compartment, one rotatable thereon and the other connected to the cam shaft for unison rotation, a positive gear drive extending from said crankshaft to the said one gear on each of said cam shafts, a planetary gear case about each of said cam shafts in surrounding relation to the pair of gears thereon and bearing on the flanges thereof for rotation about the associated shaft as an axis, orbital gear means carried by and rotatable in said gear case including two connected gears of differential tooth number meshing respectively with the gears on the associated cam shaft to respectively opposite sides thereof, a positive drive connection to each of said planetary gear cases responding to the manifold air pressure in the associated engine to rock the connected planetary gear case about its respective cam shaft and induce a motion thereof relative said crankshaft.

3. A supercharged truck engine having intake and exhaust valves; including a crankshaft, an exhaust valve actuating cam shaft, an intake valve actuating cam shaft, a crank case providing a gear compartment at one end thereof, said crankshaft being longitudinally disposed in said case and extending through said compartment, said cam shafts being disposed on opposite sides of said crankshaft in parallel nearby relation thereto, a plurality of rack means, one for each of said cam shafts, extending into said compartment in generally transverse relation to the shafts therein, manifold air pressure responsive means effecting extending and retracting motions of said racks simultaneously as the manifold air pressure changes, a planetary gear case rotatable about each of said cam shafts and connected to a respective rack to be rocked thereby about its respective shaft, a positive gear drive extending from said crankshaft to each of said cam shafts and each terminating in a first gear rotatable on the cam shaft, a second gear on each cam shaft fixed thereto for unison rotation and gear means carried by each of said planetary cases including connected gears of differential tooth number meshing respectively with said first and second gears.

4. A supercharged truck engine according to claim 3, characterized in that each of said planetary gear cases carries two longitudinally spaced apart gear means, each such means comprising connected gears meshing with respective gears on said cam shaft.

5. In an internal combustion engine having intake and exhaust valves; a crankshaft, an exhaust valve actuating cam shaft disposed on one side of said crankshaft in parallel nearby relation thereto, an intake valve actuating cam shaft disposed on the opposite side of said crankshaft in parallel nearby relation thereto, a pair of gears on each of said cam shafts, one rotatable thereon and the other connected to the cam shaft for unison rotation, a gear in common engagement with the said one gear on each of said cam shafts, a gear drive from said crankshaft to said last named gear, a planetary gear case about each of said cam shafts rotatable about its respectively associated shaft as an axis, orbital gear means carried by said gear case including two connected gears of differential tooth number meshing respectively with the gears on the associated cam shaft on respectively opposite sides thereof, a plurality of rack means, one for each of said cam shafts in generally transverse relation to said shafts, a positive connection between each of said rack means and a respective planetary gear case producing a rocking motion of the connected planetary gear case about its respective cam shaft in response to longitudinal shifting motion of a respective rack means, and manifold air pressure responsive means for effecting longitudinal shifting motion of each of said rack means.

6. In an internal combustion engine having intake and exhaust valves; a crankshaft, an exhaust valve actuating cam shaft, an intake valve actuating cam shaft, a pair of gears on each of said cam shafts, one rotatable thereon and the other connected to the cam shaft for unison rotation, a gear in common engagement with the said one gear on each of said cam shafts, a gear drive from said crankshaft to said last named gear, a planetary gear member about each of said cam shafts rotatable about its respectively associated shaft as an axis, orbital gear means carried by said gear member including two connected gears of differential tooth number meshing respectively with the gears on the associated cam shaft, and means for producing rocking motions of said gear members about their respective cam shafts to effect limited relative motion between the pairs of gears on said cam shafts and thereby adjusting motions of said cam shafts relative to said crankshaft.

7. An internal combustion engine according to claim 6, characterized in that said last named means comprises separate and independent means for producing rocking motions of each of said planetary gear members.

8. An internal combustion engine according to claim 6, characterized in that said planetary gear members are interconnected for unison motion.

9. An internal combustion engine according to claim 6, characterized in that said planetary gear members are interconnected for unison motion in respectively opposite directions.

10. A supercharged automotive engine having exhaust and intake valves including a crankshaft, an exhaust valve actuating cam shaft, an intake valve actuating cam shaft, a crank case providing a gear compartment at one end thereof, said crankshaft being longitudinally disposed in said case and extending through said compartment, said cam shafts being in parallel nearby relations thereto, a pair of flanged gears on each of said cam shafts in said compartment, one rotatable thereon and the other connected to the cam shaft for unison rotation, a positive gear drive extending from said crankshaft to the said one gear on each of said cam shafts, a planetary gear member about each of said cam shafts in embracing relation to the pair of gears thereon and bearing on the flanges thereof for rotation about the associated shaft as an axis, orbital gear means carried by and rotatable relative to said gear member including two connected gears of differential tooth number meshing respectively with the gears on the associated cam shaft, and positive drive means to rock said planetary gear members about their respective cam shafts and induce a motion thereof relative to said crankshaft.

11. A supercharged automotive engine having exhaust and intake valves including a crankshaft, an exhaust valve actuating cam shaft, an intake valve actuating cam shaft, a driving connection from said crankshaft to said cam shafts for rotating said cam shafts in unison with said crankshaft, and means for rotatively adjusting said cam shafts relatively to said crankshaft simultaneously and in respectively opposite directions to advance the phase relationship of one thereof relative to said crankshaft while retarding the other.

12. A supercharged automotive engine having exhaust and intake valves including a crankshaft, an exhaust valve actuating cam shaft, an intake valve actuating cam shaft, a gear train forming a driving connection from said crankshaft to said cam shafts for rotating said cam shafts in unison with said crankshaft, means associated with each cam shaft mounting elements of said gear train for relative orbital motion to effect rotative adjustment of a respective cam shaft relative to said crankshaft, and means interconnecting said last named means effecting rotative adjustment of said cam shafts in respectively opposite directions whereby to advance the phase relationship of one thereof relative to said crankshaft while retarding the other.

13. A supercharged automotive engine having exhaust and intake valves including a crankshaft, an exhaust valve actuating cam shaft, an intake valve actuating cam shaft, a pair of gears on each of said cam shafts, one rotatable thereon and the other connected to the shaft for unison rotation, a positive drive from said crankshaft to the said one gear on each of said cam shafts, two connected gears of differential tooth number associated with each cam shaft and meshing respectively with the gears thereon, said connected gears completing a driving connection from said crankshaft to said cam shafts, orbitally movable means associated with each cam shaft mounting respective connected gears, said last named means being movable to effect rotative adjustment of a respective cam shaft, and means interconnecting said last named means for simultaneous movement in opposite directions.

14. A supercharged automotive engine having exhaust and intake valves including a crankshaft, an exhaust valve actuating cam shaft, an intake valve actuating cam shaft, a pear of gears on each of said cam shafts, one rotatable thereon and the other connected to the shaft for unison rotation, a positive drive from said crankshaft to the said one gear on each of said cam shafts, two connected gears of differential tooth number associated with each cam shaft and meshing respectively with the gears thereon, said connected gears completing a driving connection from said crankshaft to said cam shafts, a member pivotal about each cam shaft carrying the connected gears associated with each respective shaft, said members being interconnected so that a pivotal motion of one thereof in one direction effects a corresponding motion of the other in the opposite direction, said connected gears having orbital motion in response to pivotal motion of said members and reacting against the drive from said crankshaft to effect relative rotational adjustment of each respective cam shaft, and means projected from one of said members operable to effect said pivotal motion thereof.

15. A supercharged automotive engine having exhaust and intake valves including a crankshaft, an exhaust valve actuating cam shaft, an intake valve actuating cam shaft, a pair of gears on each of said cam shafts, one rotatable thereon and the other connected to the shaft for unison rotation, a positive drive from said crankshaft to the said one gear on each of said cam shafts, a member pivotal about each cam shaft, connected gears of differential tooth number carried by each member in radially offset relation to a respective cam shaft and in overlying meshing engagement respectively with the gears thereon, said connected gears completing a driving connection from said crankshaft to said cam shafts, one of said members having an axial projecting portion engageable to pivot said one member and move the connected gears thereon orbitally to effect a rotative adjustment of the associated cam shaft, and interengaging means on said members utilizing the pivotal motion of said one member to effect a simultaneous pivotal motion of the other member.

16. A supercharged automotive engine according to claim 15, characterized in that said members are interengaged for simultaneous movement in opposite directions.

17. A supercharged automotive engine according to claim 15, characterized by means defining a gear compartment, said means including a closure plate for the front of said compartment, said cam shafts projecting into said compartment and said gears and said pivotal members being contained therein, the axial projecting portion on said one member extending out of said compartment through said closure plate for operation by means external of said compartment.

No references cited.

MARK NEWMAN, *Primary Examiner.*